United States Patent [19]
Dawson

[11] 4,111,016
[45] * Sep. 5, 1978

[54] LOCKING FASTENER ASSEMBLY

[75] Inventor: Raymond B. Dawson, Berkeley Heights, N.J.

[73] Assignee: Super Stud Products, Inc., Berkeley Heights, N.J.

[*] Notice: The portion of the term of this patent subsequent to Apr. 4, 1995, has been disclaimed.

[21] Appl. No.: 767,760

[22] Filed: Feb. 11, 1977

Related U.S. Application Data

[63] Continuation-in-part of Ser. No. 744,629, Nov. 24, 1976.

[51] Int. Cl.$^2$ ............................................. E05B 73/00
[52] U.S. Cl. ...................................................... 70/58
[58] Field of Search .................... 70/57, 58, 229, 230, 70/231, 232, 258; 85/35, 42, 45

[56] References Cited

U.S. PATENT DOCUMENTS

| | | | |
|---|---|---|---|
| 1,903,121 | 3/1933 | Lussier | 85/42 |
| 2,286,950 | 6/1942 | Breedlove | 70/229 |
| 2,978,896 | 4/1961 | Saccone | 70/231 |
| 3,492,841 | 2/1970 | Ipri | 70/231 |
| 3,540,245 | 11/1970 | Pope | 70/231 |
| 3,563,070 | 2/1971 | Earl | 70/58 |

FOREIGN PATENT DOCUMENTS 881,129  6/1953  Fed. Rep. of Germany .............. 85/45

Primary Examiner—Robert L. Wolfe
Attorney, Agent, or Firm—Stefan J. Klauber

[57] ABSTRACT

A locking fastener assembly is disclosed for securing electronic equipment or the like to a mounting bracket. The device includes a stud assembly comprising a threaded shank portion for passing through an opening in the bracket, and being threadingly received in an opening at the equipment. An enlarged head adjoining the shank has a pair of openings for receiving engaging pins from a cooperating tool. An annular freely rotatable collar surrounds the head and projects to at least cover the rim of the head, to prevent grasping of such head by a tool. A tool member is provided having a face opposable to the head, the face including a pair of engaging pins having a spacing and arrangement with respect to the tool face center which is in mirror correspondence to the spacing and arrangement of the openings on the head of the stud assembly, whereby the pins may engage with the openings in the head to permit application of torque for tightening and loosening the stud assembly. The tool member is therefore keyed to engage with the head portion; i.e. a similar tool which is unkeyed to the pattern of head openings will not be operable to engage with the stud assembly.

8 Claims, 6 Drawing Figures

LOCKING FASTENER ASSEMBLY

This application is a continuation-in-part of my copending application, Ser. No. 744,629, filed Nov. 24, 1976 and entitled "LOCKING FASTENER ASSEMBLY".

BACKGROUND OF INVENTION

This invention relates generally to fastening devices and assemblies, and more specifically relates to an assembly of this type which is useful in deterring theft or unauthorized removal of affixed electronic equipment or the like.

In recent years enormous interest has developed in various electronic accessories, which are installable at a vehicle or other location by a purchaser of such equipment. Reference is made here particularly to the explosive interest which has developed in the field of CB communications equipment. Devices of this type, as well as other electronic accessories, such as tape players or so forth, are commonly purchased by the user subsequent to purchase of the automobile or other vehicle in which such equipment is to be installed. In a typical procedure, for example, a bracket, such as a mounting yoke or the like, is secured by relatively permanent means within the vehicle as, for example, by mounting same under a dashboard. The electronic equipment per se, such as the CB transceiver, is then secured to the bracket or the like, by means of relatively conventional easily installable and removable fasteners.

In a typical prior art arrangement, for example, the said transceiver is emplaced within a yoke-like bracket by means of threaded fasteners which pass through openings in the yoke and are threadingly received into openings at the sides of the CB unit. These fasteners are often provided with enlarged heads, which can be manipulated manually or by a tool; i.e. the fasteners function in the manner of wing bolts.

As is now all too familiar, however, to users of equipment of the aforementioned type, as well as to law enforcement officials, the theft rate with respect to such equipment has reached epidemic proportions. Consideration of the theft pattern indicates that a major reason for same is the relative ease with which the equipment may be detached from the vehicle. In most instances investigation reveals that the thief simply acquires the equipment by removing the aforementioned fastening means, which is unfortunately a very simple and fast operation.

The problem outlined in the foregoing paragraph is not, of course, unique to the electronic equipment field. In numerous other environments, equipment including office machines such as typewriters or the like, are stolen with ease — in part because of absence of fastening devices tending to deter such theft. While numerous devices have been described over the years, which in one manner or another effect fastening so as to discourage removal of the fasteners (and thus of the equipment), by and large these devices have not been particularly effective; and none are deemed especially suitable for use in the environment especially considered by the present invention.

In accordance with the foregoing, it may be regarded as an object of the present invention, to provide a fastener assembly which is especially adapted for securing electronic equipment or the like to a vehicle-attached mounting bracket, which assembly is readily installed and removed by an authorized individual, but which can be removed only with great difficulty by thieves or other unauthorized personnel.

It is a further object of the present invention to provide a device of the aforementioned character, which includes a stud assemby and a separate tool member for use therewith, which elements are keyed to one another, thereby preventing use of similar tool members with the stud assembly if not specifically keyed thereto.

SUMMARY OF INVENTION

Now in accordance with the present invention, the foregoing objects, and others as will become apparent in the course of the ensuing specification, are achieved in a locking fastener assembly, which includes a stud assembly comprising a threaded shank portion and an enlarged heat portion adjoining the shank portion, a collar surrounding the head portion and freely rotatable thereabouts, and a tool member engageable with openings provided in the aforementioned head portion. The annular collar is freely rotatable about the head and projects to at least cover the rim of said head, thereby preventing grasping of the head by a wrench, pliers or similar tool. The threaded shank portion, in use, passes through an opening in the bracket or similar plate affixed to the vehicle, and is threadingly received in an opening at the equipment to be secured. The enlarged head portion is provided with a pair of openings for receiving engaging pins from the cooperating tool member.

The tool member of the fastener assembly has a face opposable to the aforementioned head portion, which face includes a pair of engaging pins arranged in a pattern in mirror correspondence to that on the head portion. By overlying the pattern on the tool member with the corresponding pattern on the head portion, the pair of pins may engage with the corresponding openings in the head to permit application of torque for tightening and loosening the stud assembly. The tool member is therefore keyed to engage with the head portion; i.e. a similar tool which is unkeyed to the pattern of head openings will not be operable to engage with the stud assembly.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
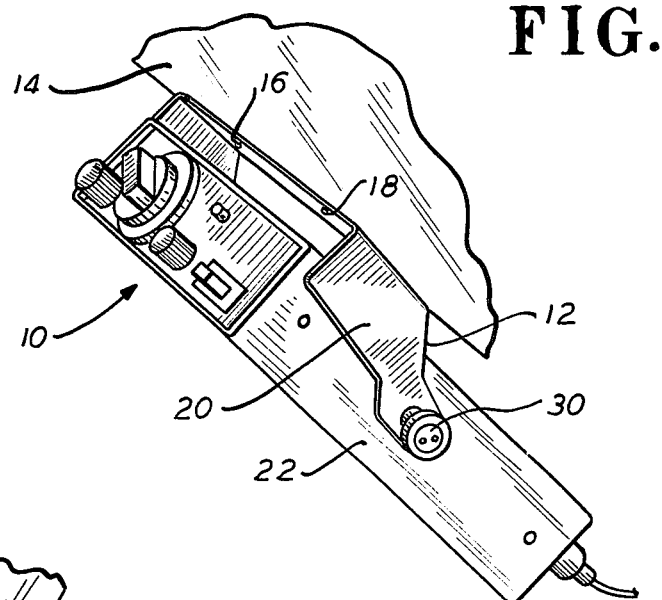
FIG. 1 is a perspective view, illustrating the stud assembly portion of the present invention in use securing a representative piece of electronic equipment.

In FIG. 1 herein a perspective view appears illustrating a typical application to which the present fastener may be placed. There is thus shown therein, a conventional CB transceiver 10, which per se does not constitute part of the present invention except to set forth the area of application of the invention. Transceiver 10 as is typical and representative of the art, is secured within a vehicle or similar environment by means of a mounting bracket 12, which in the present instance takes the form of a yoke. Bracket 12 is secured to a permanent portion of the vehicle as, for example, the underside 14 of a dashboard by means of relatively permanent fasteners 16 and 18. In a typical installation fasteners 16 and 18 are relatively inaccessible for removal by a vandal or thief.

Figure 2:
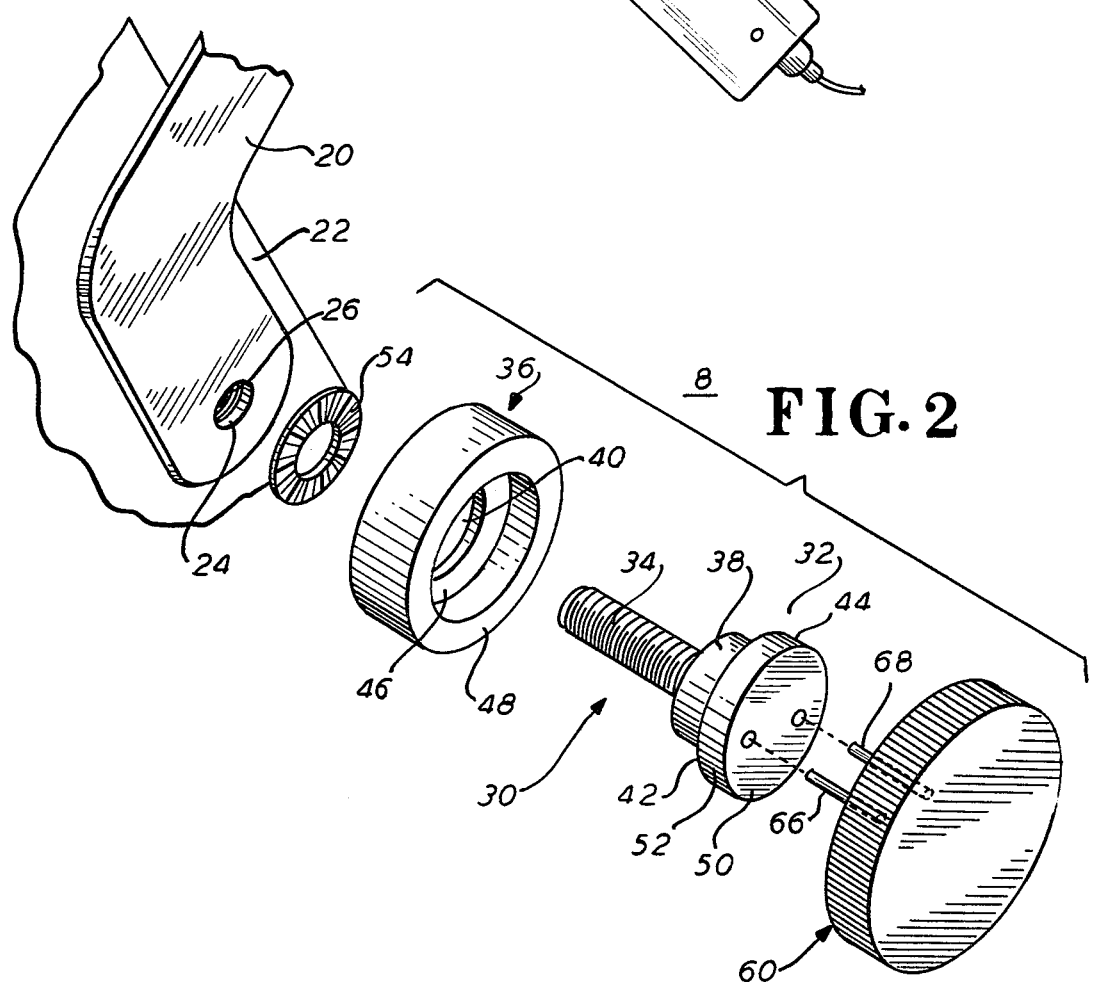
FIG. 2 is an exploded perspective view of the preferred form of locking fastener assembly in accordance with the invention.

By referring particularly to the exploded view of FIG. 2, it will be seen that the arms 20 of bracket 12 lie adjacent the side 22 of transceiver 10. In prior art practice a simple wing-type bolt or similar conventional fastener passes through the opening 24 in arm 20, and then is threadingly received in an opening 26 provided at side 22 of the transceiver. In practice a plurality of receiving openings 26 may be present in such electronic unit, and thus a plurality of such wing bolts or the like may be used — although in the most common case the number of such openings and corresponding wing bolts is limited to about two (one on each side of the electronic unit).

It should, of course, be understood in connection with the description thus far provided, that the present invention is not limited to use with any particular type of electronic equipment. Thus transceiver 10 is merely representative of a large group of devices of this type widely used as accessories in vehicles, including e.g. tape players, recorders, and similar instruments well known to those familiar with the art. Similarly it is re-emphasized that while the present invention is especially useful in securing accessories or the like within vehicles, the invention finds application in numerous other fields — e.g. in securing typewriters or other office equipment to desks, tables or the like.

In accordance with the present invention the conventional wing bolt as heretofore described, is replaced by a stud assembly 30 — which includes a head portion 32 and shank portion 34. Shank portion 34 passes through opening 24 in bracket 12 and is engaged in the threaded opening 26 within transceiver 10. When thus threadingly received head portion 32 is surrounded by a collar 36, with the reduced part 38 of the head portion passing through the opening 40 in collar 36 so that the lower surface 42 of enlarged head disc 44 rests on the recessed rim 46 within collar 36. The collar 36 constitutes a tough and resistant metal such as a machined stainless steel or the like, and is freely rotatable about head portion 32. Since further the upper face 48 of collar 36 extends, when assembled, to at least or beyond the axial coordinate of face 50 of head portion 32, it will be clear that the rim 52 of such head portion cannot be grasped by a tool such as a wrench or pliers, which can at best grasp the collar 36 and rotate same about the said head portion. A conventional locking washer 54 may conveniently be provided between mounting bracket 12 and stud assembly 30 to assist in tightening the stud assembly in place.

Figure 5:
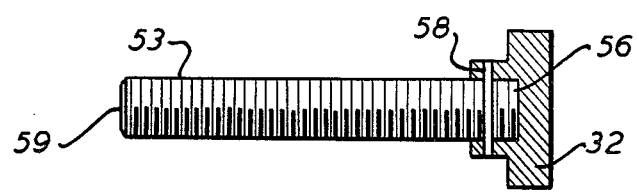
FIG. 5 is a longitudinal cross-sectional view through an alternate embodiment of a stud assembly utilizable with the invention.
Figure 6:
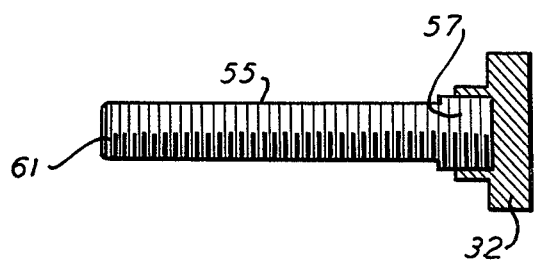
FIG. 6 is a longitudinal cross-sectional view through a yet further type of stud assembly utilizable with the invention.

The stud assembly 30 can be formed as a unit by conventional machining or other operations. It is also within the province of the invention however, for shank portion 34 to be separate from head portion 32. Embodiments of this latter type structure appear in FIGS. 5 and 6. In both of these instances the shank portion 53 or 55 is threaded at both the distal ends 59 and 61 thereof, i.e. that receive into opening 26; and also at the ends 56, 57 which are to be received within head portion 32. The advantage of the "separable" arrangements of FIGS. 5 and 6, is that one may provide in a single kit, several shank portions, the distal ends of which have different diameters enabling use thereof with differing equipment. Thus in FIG. 5 the shank portion 53 is seen to have a uniform diameter throughout, while in FIG. 6 the shank portion 55 has a diameter at its end 57 which is identical to end 56 of the shank portion 53 shown in FIG. 5; however, the diameter is thereupon reduced at the remaining portion 55 thereof. Hence it will be clear that the shank portion 53 or 55 of FIGS. 5 or 6 may be used with the same head portion 54, while the distal ends 56, 57 thereof differ in the two cases to enable accommodation to specific equipment.

A pin 58 may be passed through ends 56 or 57 (as shown in FIG. 5) and engage in head portion 32, to lock the shank portions against relative rotation with respect to head portion 32 during removal of stud assembly 30. Other techniques can be used to achieve the same result; e. g. an adhesive may be interposed between head portion 32 and shank portion 53 or 55, or an interference fit may be provided between the threaded shanks and head portions.

The fastener assembly 8 of the present invention is specifically adapted so that the stud assembly 30 thereof may be inserted and removed by the tool member 60. Referring more specifically to the top plan view of FIG. 3, it is seen that face 50 of head portion 32 is provided with a pair of openings 62a and 62b, which are arranged with respect to one another as to define a pattern generally designated at 64. Openings 62a and 62b are circular unthreaded cavities extending into disc 44, e.g. typically to a depth sufficient to receive a pair of engaging pins 66 and 68, which are associated with tool member 60.

Figure 4:
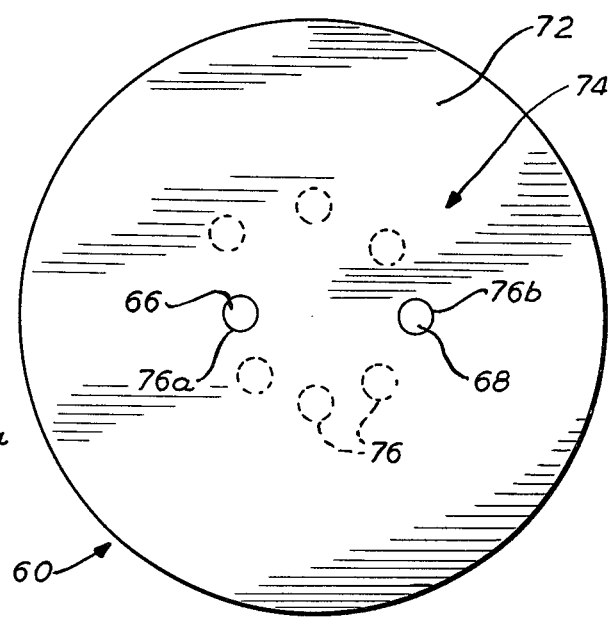
FIG. 4 is a plan view of the lower face of the tool member appearing in FIG. 2.

As will shortly be evident, the openings 62a and 62b are, as mentioned, intended to mate with the pins 66 and 68 which are carried by tool member 60. Referring thusly to FIG. 4, it is specifically to be noted that the pins 66 and 68 are secured to face 72 of tool member 60 so that the pattern 74 presented by such pins is in mirror correspondence to the pattern 64 of the openings at face 50 of stud assembly 30. The pins 66 and 68 may thus be received by frictional or other fit within openings 76a and 76b machined into face 72.

Figure 3:
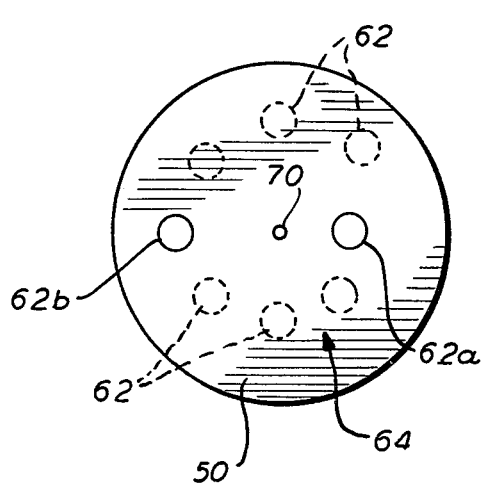
FIG. 3 is a top plan view of the head portion of the stud assembly shown in FIG. 2.

In a typical form in which an assembly 8 produced pursuant to the invention is marketed, face 50 of head portion 32, as illustrated in FIG. 3, is provided with a pair of openings 62a and 62b as already discussed; however, such openings will not in all instances of manufacture of assembly 8 be placed precisely as shown in FIG. 3. Rather, in a typical generalized application of the invention openings 62a and 62b can be located at various "possible" positions — which positions are more generally suggested at 62 in shadow. In the arrangement thus shown in FIG. 3, a series of such possible openings 62 are seen to define a spiral, the center of which is at 70; thus it will be seen that the actual openings 62a and 62b reside on this same spiral.

While the actual openings 62a and 62b can in the most general case be present at any two spaced points upon face 50, a preferable arrangement is indeed for the said openings to reside on a spiral, the center of which is at the face 50 — since this permits during manufacture of the present assembly a relatively large number of unique combinations, i. e. combinations of two actual openings each of which reside on the said spiral. It, of course, will be evident — from an analysis of the characteristics of the spiral — that openings 62a and 62b can also be described as residing at differing distances from the center 70 of face 50.

Referring to FIG. 4, as already indicated, a plan view of tool member 60 is set forth. The pattern 74 of the two pins 66 and 68 is clearly such (as already indicated) as to be in mirror correspondence to the pattern 64 present on face 50 of the stud assembly 30. In correspondence to the discussion had with respect to FIG. 3, there is shown in FIG. 4 (in shadow) additional "possible" locations for the pins, i. e. this is suggested by the shadow lines indicating possible further positions for openings 76, any pair of which can carry the pins 66 and 68. Pursuant to prior discussion the preferred pattern of the possible such openings 76 is in the form of a spiral, which spiral is in mirror correspndence to the spiral discussed in connection with FIG. 3.

Again it is emphasized here that the pins in any event are mounted as to be in mirror correspondence to the pattern on face 50; and while it is preferable for the pins (as is the case with the openings on face 50) to be at differing distances from the geometrical center of face 72, other arrangements for the paired pins and stud assembly openings are within the province of the invention. For example, the said openings and pins can reside at a common distance from the respective center of the face 50 and face 72. In this last instance differing possible keyed arrangements between tool member 60 and stud assembly 30 are enabled by manufacturing different assemblies 8 so that the said pins and mating openings having differing separations alongthe circle on which they reside; i.e. in one such assembly the pins (and mating openings) might be 180° apart with respect to the centers of faces 50 or 72, whereas in a differing assembly 8 the said openings or pins might be separated by but 90° of the subtended arc. Thus in all these instances a sufficient variety of differing keyed assemblies 8 can be made available to the purchaser as to render it unlikely that a given tool member 60 will be operable with a randomly selected stud assembly 30.

With the aid of the foregoing it will be clear that the tool member 60 can be utilized for applying torque to tighten or loosen stud assembly 30, by inserting the engaging pins 66 and 68 within a pair of openings 76 in tool member 60, and then bringing the said tool member in overlying relationship to face 50, so that the patterns 64 and 74 overlie. The said pair of pins 66 and 68 then are made to engage the corresponding opening pair at face 50, which then permits the user to tighten or loosen stud assembly 30.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed and limited only by the scope and spirit of the claims now appended hereto.

I claim:

1. A locking fastener assembly for securing electronic equipment or the like to a mounting bracket or the like, comprising in combination:
    a stud assembly comprising a threaded shank portion for passing through an opening in said mounting bracket and being threadingly receivable in an opening at said equipment, and an enlarged head portion at one end of said shank portion having a pair of openings for receiving engaging pins therein from a cooperating tool;
    an annular collar surrounding said head portion and projecting in a direction opposite said threaded shank to at least cover the rim of said head portion, said collar being freely rotatable about and unlockable with respect to said head portion to prevent grasping of said head portion by a tool or interlocking of said head portion with said collar; and
    a tool member having a face opposable to said collar and head portions, said face including a pair of engaging pins arranged in a pattern mirroring said pattern on said head portion, whereby by overlying said pattern on said tool member with said mirroring pattern on said head portion, said pair of pins may engage with corresponding openings in said head to permit application of torque to tighten and loosen said stud assembly.

2. A locking assembly in accordance with claim 1, wherein said pins and openings reside on spirals centered at the respective faces of such head portion and tool member.

3. A fastener assembly in accordance with claim 1, wherein said collar projects in said direction opposite said threaded shank beyond the plane of said head.

4. A fastener assembly in accordance with claim 1, further including lock washer means between said stud assembly and the engagement point with said bracket, for locking said assembly against rotation.

5. A device in accordance with claim 1, wherein said threaded shank portion is separable from said head portion and is threadingly received in said head portion.

6. A locking assembly in accordance with claim 5, wherein the end of said threaded shank portion distal from said head portion has a diameter differing from the portion threadingly receivable within said head portion.

7. In the method for securing electronic equipment or the like in a vehicle, said equipment being of the type including at least one threaded opening for normally receiving a securing bolt by passage of said bolt through a mounting means secured to the said vehicle and into said equipment opening; the improvement enabling ready securing of said equipment while discouraging unauthorized removal thereof, comprising the steps of:
    providing a plurality of stud assemblies, each including a threaded shank portion for passing through said mounting means and being threadingly receivable at said opening at said equipment, and an enlarged head portion at the opposed end of said shank portion, the head portion of any said stud assembly having a pair of openings for receiving engaging pins therein from a cooperating tool, the spatial pattern of said openings differing among at least some of said plurality of stud assemblies; and an annular collar surrounding said head portion, said collar being freely rotatable about and unlockable with respect to said head portion and projecting in a direction opposite said threaded shank to at least the end of said head portion, to thereby prevent grasping of said head portion by a tool or interlocking of said head portion with said collar;
    providing a plurality of tool members, each said tool member having a face opposable to said collar and head portions, said face including a pair of engaging pins in a pattern in mirror correspondence to said pattern on the head portion of a said stud assembly mateable with said tool member;

whereby by overlying said pattern on said tool member with the corresponding pattern on the head portions of said stud assembly meteable therewith, said pair of pins are engageable with said pair of openings in said head to permit application of torque to tighten and loosen said stud assembly, but whereby a further of said tool members wherein said pins are not keyed in correspondence to said head openings cannot be engaged with the said head portion of said stud assembly.

8. A method in accordance with claim 7, wherein said openings and said pins on said plurality of said stud assembly head portions and tool members collectively reside on loci defining spirals centered at the faces of said stud head portion and said tool member.

* * * * *